Nov. 4, 1930.  T. H. BATESON  1,780,259
CLUTCH RING SHEARING MACHINE
Filed May 12, 1928  3 Sheets-Sheet 1
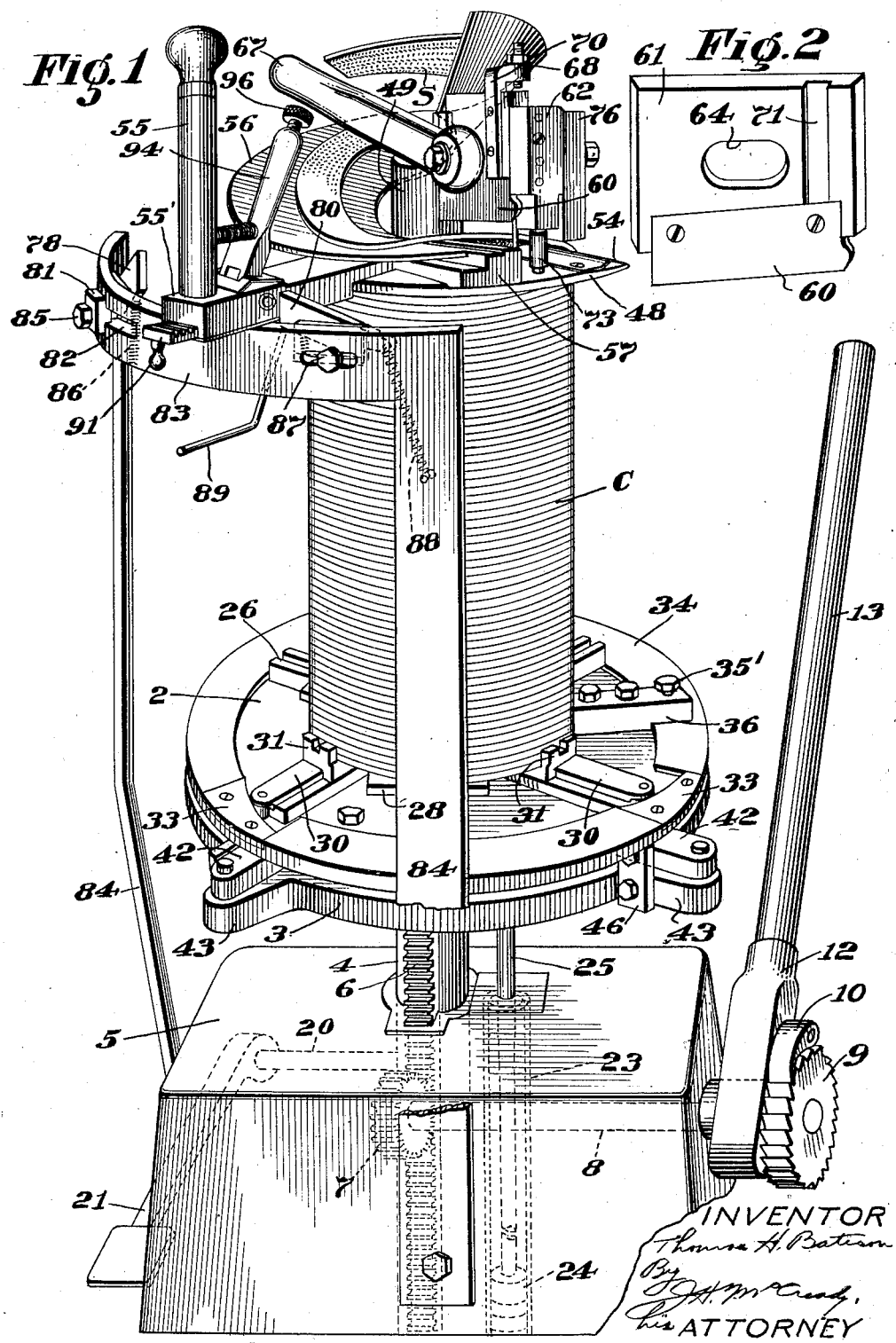
INVENTOR
Thomas H. Bateson
By J. H. McCready,
his ATTORNEY Nov. 4, 1930.  T. H. BATESON  1,780,259
CLUTCH RING SHEARING MACHINE
Filed May 12, 1928   3 Sheets-Sheet 2
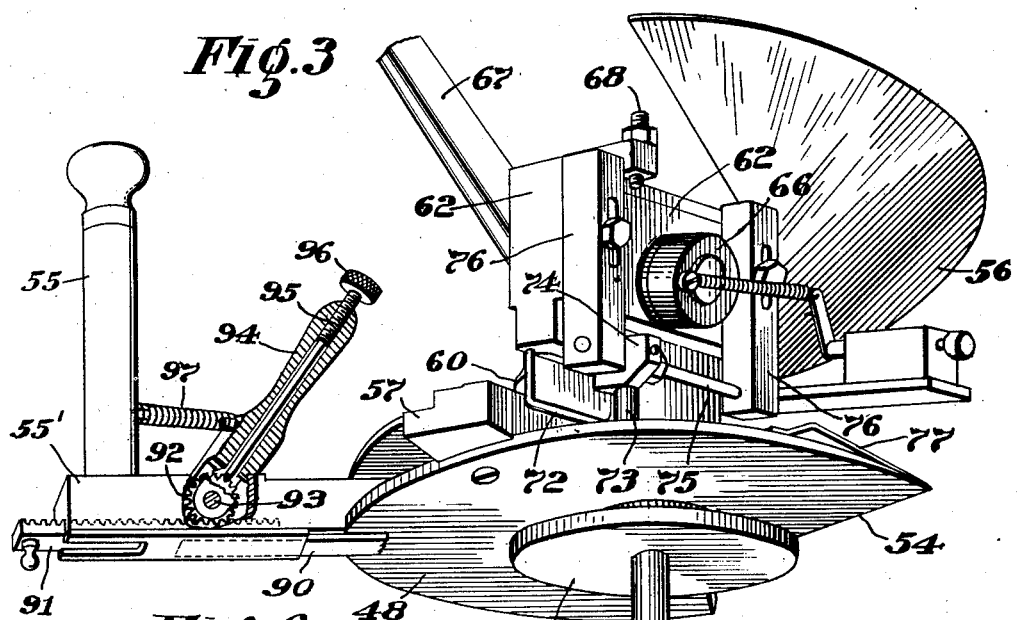
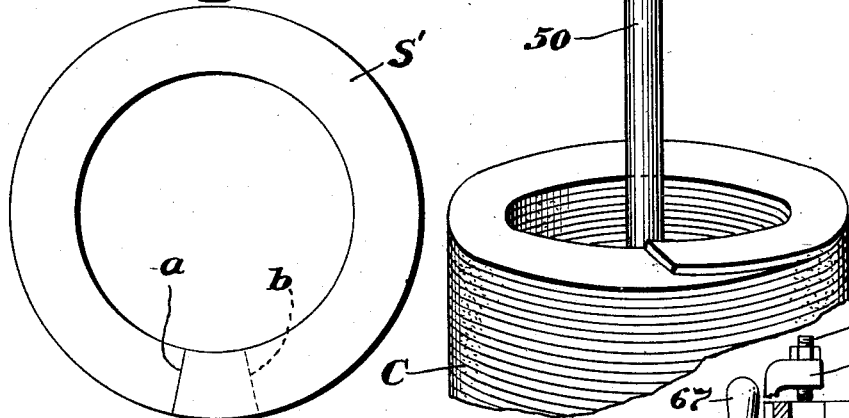
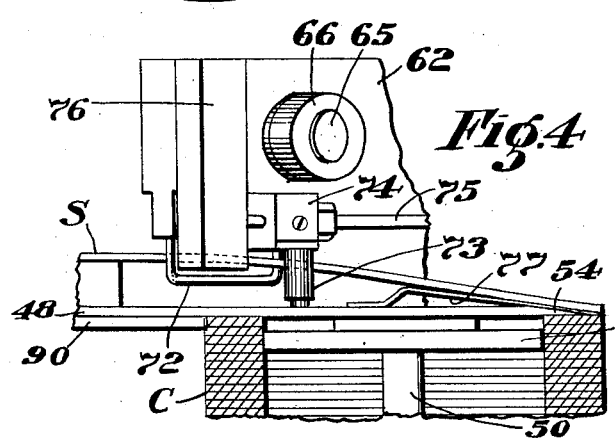

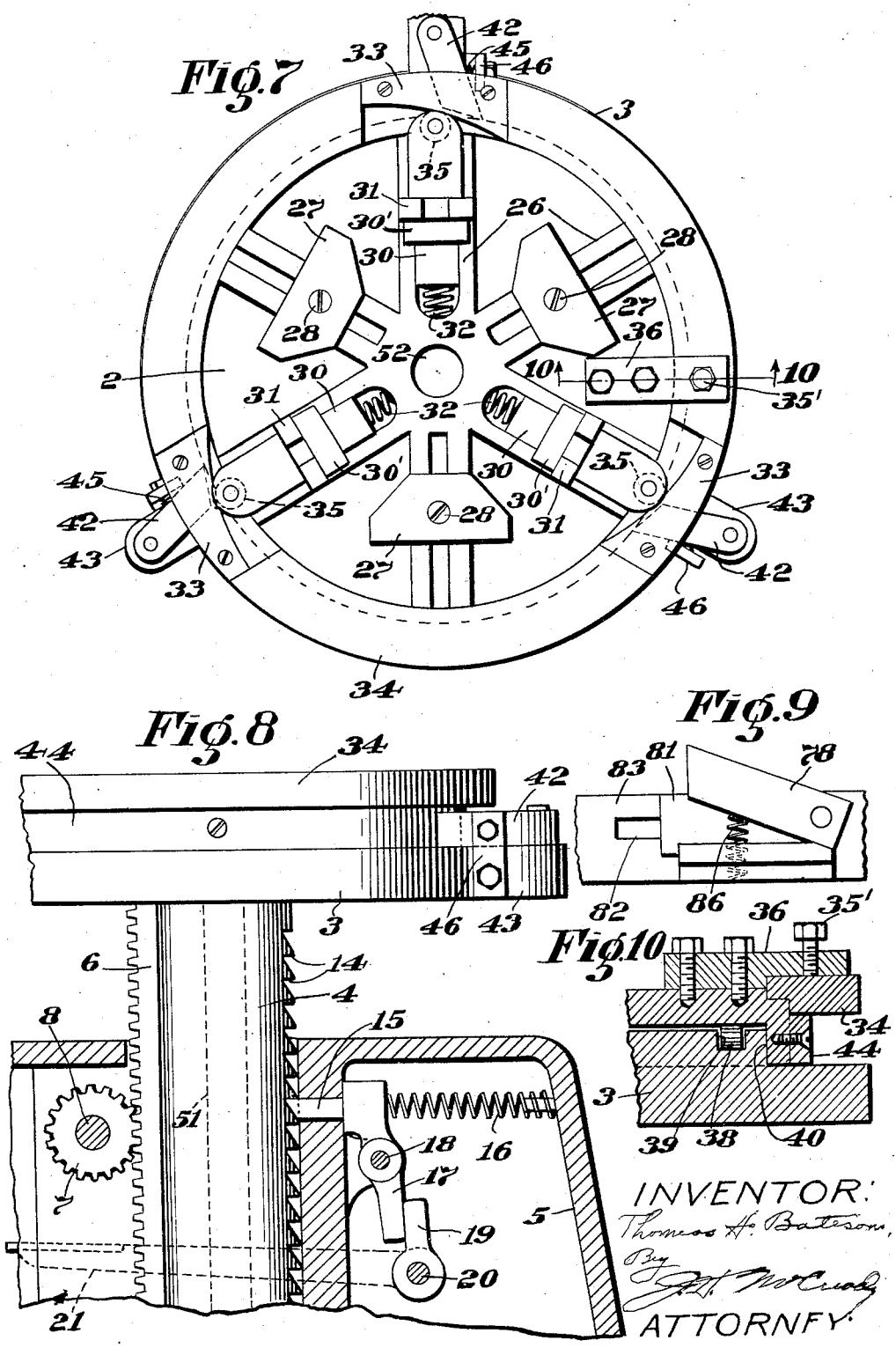

Patented Nov. 4, 1930

1,780,259

UNITED STATES PATENT OFFICE

THOMAS HANDEL BATESON, OF WALPOLE, MASSACHUSETTS, ASSIGNOR TO MULTI-BESTOS COMPANY, OF WALPOLE, MASSACHUSETTS, A CORPORATION OF MASSACHUSETTS

CLUTCH-RING-SHEARING MACHINE

Application filed May 12, 1928. Serial No. 277,375.

This invention involves a machine adapted especially for use in the manufacture of clutch rings and other friction facings.

According to a common method of making clutch rings or clutch facings, a heavy asbestos tape is woven which subsequently is wound edgewise on a mandrel to produce a compact coil. Prior to being so wound the tape usually is impregated with materials designed to bind its fibres together and give the finished product the desired coefficient of friction, and the tape is baked while on the mandrel to cure the impregnating medium. This makes the fabric relatively hard and stiff. After the baking operation has been completed the coil of tape is cut to form individual rings or facings, and this operation must be performed accurately or the rings will not be of the desired diameter. It has been found impractical to make the coil of the exact diameter required for the finished ring, and it has therefore been a common practice to unwind the tape from the coil and cut it into lengths slightly greater than that required for an individual ring or facing. Later the individual lengths so cut are placed on a form of the proper size and cut accurately. Usually the ends of each ring are next stapled together and the rings are then pressed to make them lie flat and bring them down to substantially the desired thickness.

The method of cutting the fabric, as above described, involves considerable hand labor and wastes a percentage of the fabric which, while small in an individual ring, still amounts to a very substantial item in the course of a week's production.

It is the general object of the present invention to economize both labor and materials in performing this cutting operation. The invention aims especially to devise a machine with which the cutting operation can be performed rapidly and accurately and in which waste of the facing material will be practically eliminated.

The nature of the invention will be readily understood from the following description when read in connection with the accompanying drawings, and the novel features will be particularly pointed out in the appended claims.

In the drawings,

Figure 1 is a perspective view of a machine constructed in accordance with this invention;

Fig. 2 is a perspective view of the knife and the holder therefor;

Fig. 3 is a perspective view, partly in cross-section, showing the mechanism at the head of the machine elevated above the coil;

Fig. 4 is a cross-sectional view through the upper part of the coil illustrating certain details of the mechanism at the head of the machine;

Fig. 5 is a sectional view of the cutting mechanism;

Fig. 6 is a plan view showing a typical length of the strip severed from the coil to form an individual ring;

Fig. 7 is a plan view of the parts for supporting the coil in the machine;

Fig. 8 is a view, partly in vertical section and partly in side elevation, showing the platform on which the coil is mounted and the supporting means therefor;

Fig. 9 is a side view of one of the stops; and

Fig. 10 is a sectional view on the line 10—10, Fig. 7.

The machine shown in the drawings includes a rotary table 2 for supporting a coil C of clutch facing or other material to be cut. It will be observed that the clutch facing material is flat and is wound edgewise so that adjacent turns progress axially of the coil, and the plane of any individual coil intersects the axis of the coil. This table is supported by an elevator mechanism which comprises a platform 3 and a plunger 4 on the upper end of which the platform is mounted, the plunger being guided for vertical movement in a base 5. In order to raise the platform the plunger 4 has a rack 6 set into it at one side thereof and secured rigidly thereto. This rack meshes with a pinion 7 fast on a horizontal shaft 8 which is supported in bearings in the base 5. At a point outside the base the shaft has a ratchet wheel 9 secured fast to it and arranged to be engaged by a pawl 10 pivoted on the head 12 of a hand lever 13, the head being mounted to swing freely on the shaft 8. In order to hold the plunger 4 in its elevated position a vertical series of teeth 14 are formed in the face of the plunger opposite to the rack 6, and a horizontal dog 15 is mounted in the base to engage these teeth. Normally the dog is held in contact with the teeth by a coiled spring 16, Fig. 8, and for the purpose of releasing it from the teeth the dog is formed on the end of a lever 17, fulcrumed at 18, and the lower end of the lever is arranged to be engaged by a short arm 19 secured on the rock shaft 20. This rock shaft projects through the base 5, and at a point outside the base a treadle lever 21 is secured to it, as shown in Figs. 1 and 8. Consequently, by depressing the lever 21 the dog 15 will be drawn backwardly out of engagement with the teeth 14, as will be clear from an inspection of Fig. 8. This will permit the platform 3 and the parts mounted thereon to drop.

The lowering movement of the platform is checked by a dash pot mechanism comprising a tube 23, Fig. 1, mounted in an upright position in the base and closed at its lower end by a plunger 24 which slides freely in this tube and which is mounted on the lower end of a rod 25 projecting from the bottom of the platform 3.

For the purpose of supporting coils C of different sizes on the table 2 and fastening them to the table, a spider 26, Fig. 7, is mounted on, or formed integral with the table. As shown, this spider has six arms, three of which are grooved and undercut to receive nuts for securing small plates 27 in different positions of radial adjustment. These plates rest on the arms and are adapted to form the chief bearing for the bottom face of the coil. Each plate has a screw 28 projecting through it and threaded into the nut which slides in the groove for its respective arm. The other three arms which alternate with those carrying the plates 27 are grooved to receive slides 30 each slide carrying a jaw 31 for engaging the edge of the coil C, as best shown in Fig. 1. Springs 32 act on the inner ends of the slides 30 to press them outwardly, and they may be adjusted inwardly in unison by cams 33 secured in a ring 34 which encircles the table 2. Each slide 30 carries a roll 35 at its outer end to engage its respective cam 33. Consequently, by rotating the ring 34 relatively to the table 2 in a counter clockwise direction, Fig. 7, the cams 33 will act on the rolls 35 to move the slides 30 inwardly and thus cause the jaws 31 to grip the coil C and secure it in its upright position on the table 2. Each slide also is provided with a step 30' to cooperate with the plates 27 in supporting the coil.

When the coil has been fastened in the manner just described the ring 34 and table 2 may be locked against relative rotation by turning the locking bolt 35' down. This bolt is carried by a bracket 36 which is bolted to the table 2 and is provided with a part overhanging the ring 34, the bolt 35' being threaded through this overhanging part so that it can be made to bind against the ring 34 and thus effectually resist any tendency to rotate the ring relatively to the table.

For purposes which will later appear, it is desirable to revolve the coil C, and for this reason the table 2 is mounted to rotate on the platform 3 about a vertical axis. This is accomplished by supporting the table on rolls, one of which is shown at 38, Fig. 10, the entire series of rolls running in a circular groove 39 formed in the upper surface of the platform 3. A marginal flange on the table 2 is guided by the peripheral surface 40, Fig. 10, of the raised central portion of the platform 3 and holds the table centered.

In this machine rotation of the coil C in a clockwise direction only is normally desirable. A series of dogs 42 therefore are supported on projections 43, respectively, extending from the edge of the platform 3. Each dog has a sharp point to engage the outer surface of a wear piece 44 which is secured to the table 2. A spring 45 is provided to press each dog against the periphery of the ring 44, each spring being backed up by a plate 46. The angle of the dogs is such, as will be evident from an inspection of Fig. 7, that they permit a substantially free rotation of the table 2 in a clockwise direction but prevent any attempt to revolve the table in a reverse direction.

At the head of the machine devices are provided for unwinding the strip S of facing material from the coil C and severing it to produce lengths suitable for individual facings. These parts are mounted on a plate-like support 48, Figs. 1 and 3, which is secured rigidly to, or formed integral with, a central boss 49, Fig. 1. When the machine is in operation the plate 48 rests on the top of the coil C, and the plate and the parts carried thereby are held centered with reference to the coil by means of an upright shaft 50, the upper end of which is removably secured to the hub 49, while its lower portion is guided in a hole 51, Fig. 8, formed axially in the plunger 4. A hole 52, Fig. 7, is provided in the table 2 and through the platform to accommodate the shaft 50. At the upper end of the shaft a disk 53, Figs. 3 and 4, is removably mounted on the shaft 50 just below the plate 48, and serves to steady the upper end of the coil C and to center this end of the coil, a disk being used which agrees substantially in diameter with the internal diameter of the coil. One side of the plate 48 is cut away and bevelled, as shown at 54, to provide a blunt or relatively thin edge adapted to enter between adjacent turns of the coil and unwind the strip or separate it from the main body of the coil. This operation is performed by rotating the plate or support 48 in a counter clockwise direction, and for this purpose a handle 55 is secured rigidly to the plate. As the plate is revolved its edge 54 lifts the strip of tape, forces it through a cutting mechanism and along an inclined sheet metal guiding plate 56, as clearly shown in Figs. 1 and 3.

The cutting mechanism for shearing the strip S comprises a fixed block 57 secured rigidly on the support or plate 48 with a hardened shear block 58, Fig. 5, set into it and secured by screws, one of which is shown at 59. Cooperating with this shear block is a knife or cutter 60, preferably having an inclined edge as shown in Fig. 2. This cutter is carried by a slide 61 of dove-tail form and mounted to reciprocate vertically in a bracket 62 which is formed integral with the hub 49 previously referred to. The cutter is actuated by an eccentric 63 working in a slot 64 in the cutter slide 61, Fig. 2. The eccentric preferably is made integral with a shaft 65 mounted to rotate in the bracket 62 and having a collar 66 secured to its rearward end. A handle 67 is secured on the forward end of the shaft and serves as the operating means for the cutter.

The arrangement is such that when the handle is in its backward position, as shown in Fig. 1, the cutter is raised, and as the handle is moved forward into the position shown in Fig. 3, the cutter is lowered, sliding down past the shearing block 58 and cutting progressively across the width of the tape S. This movement of the cutter is limited by the contact of a screw 68 with the upper surface of the bracket 62, the screw being threaded through the right angle portion of an L-shaped arm 70 which is secured in a groove 71, Fig. 2, formed in the slide 61.

For the purpose of guiding the strip S of tape accurately to the cutting mechanism, a U-shaped guide 72, which may conveniently be made of wire, is secured to the lower edge of the bracket 62. A roll 73 also is provided to engage the outer edge of the strip S just before it reaches the guide 72 and thus to assist, if necessary, in directing the strip into latter guide. This roll is mounted on a stud carried by and projecting downwardly from a block 74, Figs. 1 and 4. A horizontal rod 75 supports this block for adjustment toward or from the axis of the support 48 and is itself supported in two upright pieces 76—76 which are adjustably bolted to the bracket 62 so that the rolls 73 may be raised or lowered as desired. A plate 77 bent as shown in Figs. 3 and 4 preferably is riveted to the upper surface of the supporting plate 48 where its upper inclined surface forms approximately a continuation of the bevelled edge 54 and assists in directing the tape upwardly across the cutter block 57.

Arranged to cooperate with the handle 55 are two stops 78 and 80, respectively. The first of these stops is pivotally mounted on a bracket 81 which is adjustable in a slot 82 formed in a horizontal bar 83 that is supported in its operative position by two upright members 84—84 both secured to the base 5. The stop may be secured in its adjusted position by a bolt 85. A spring 86 tends to hold the stop in its raised position. The stop 80 is similarly mounted. It is secured in its adjusted position by a bolt 87 and normally is held raised by a spring 88. It is equipped with a handle 89 by means of which it may be lowered out of the path of movement of the handle.

At certain times it is desirable to compel the coil C to rotate in a clockwise direction with the handle 55 and support 48. For this reason a small plate 90, Figs. 3 and 4, is secured to a rack 91 and both are mounted to slide longitudinally at the lower side of the bar 55' which forms one element of the handle. A small pinion 92 meshes with the rack 91 and is mounted in the bar 55' on a shaft 93. Fulcrumed on this shaft is an auxiliary handle 94 carrying a long pin provided with a screw threaded portion 95 and a knurled head 96 by means of which it may be rotated to move its point into or out of engagement with the pinion 92. A compression spring 97 interposed between the handles 55 and 94 normally holds the latter handle forward, as shown in Fig. 3. With the parts in the position shown in this figure the rack 91 and plate 90 will be held withdrawn or retracted. By pulling backwardly on the auxiliary handle 94 the slide 90 may be advanced and its toothed end engaged with the uppermost turn or turns of the coil C, as shown in Fig. 4. The screw threaded pin 95 permits the setting of the slide 90 in accordance with the diameter of the coil.

In using the machine a coil C of facing material is mounted on the table 2 in an upright position, substantially as shown in Fig. 1, and the supporting plate 48 and the parts carried thereby, are located approximately as shown in this figure. The coil C is practically always made slightly smaller in diameter than the diameter of the finished clutch ring so that in order to cut off a length suitable for an individual ring it is necessary to measure off slightly more than one turn of the coil. A typical length for an individual ring is shown in Fig. 6 at S'. Assuming that a cut has just been made and that the member 55' of the handle is resting against the stop 80, the end of the strip S at this time will be exactly in alinement with the edge of the cutter 60. This end is shown in Fig. 6 at a. The handle 55 now is grasped in the hand of the workman, and the auxiliary handle 94 is drawn toward the handle 55, thus projecting the toothed edge of the slide 90 into engagement with the side of the coil as shown in Fig. 4. While he holds the auxiliary handle in this position, he swings the handle 55 back, or in a clockwise direction, Fig. 1, until its motion is stopped by the stop 78. This movement will rotate the entire coil C and result in carrying the end $a$, Fig. 6, of the strip of tape backwardly or in a clockwise direction, a distance equivalent to the distance $a$—$b$, Fig. 6. The auxiliary handle 94 now is released, thus freeing the coil C from the control of the handle 55. The workman next presses down on the handle 89 to move the stop 80 out of the path of the handle bar 55', and then rotates the handle 55 in a counter-clockwise direction. Immediately after the handle 55 has passed the stop 80, the workman releases the handle 89 and he continues to swing the handle 55 around in a counter-clockwise direction until it has made slightly more than one complete revolution and is stopped by the part 80. During this entire movement the coil C has remained stationary, any movement of it with the handle 55 and parts moved thereby being prevented by the dogs 42. Consequently, this rotation of the handle with the supporting plate 48 and the parts mounted on it, results in unwinding slightly more than one turn of the strip S from the coil, moving this strip through the cutting mechanism, and stopping the relative rotation of the coil and cutting mechanism with the edge of the cutter 60 directly over the line $b$, Fig. 6. The parts remain in this relationship while the operator swings the cutter handle 67 forward and severs the strip on the line $b$. It will be observed that the guide plate 56 serves to direct the part of the strip in advance of the cutter upwardly and into a position where it is entirely out of the way of the cutting and guiding devices. The severed length is now removed and the operations above described are repeated. As the unwinding and cutting operations proceed, the top of the coil gradually drops and the plate 48, which rests on the coil, follows it down. It is, therefore, necessary to operate the lever 13 occasionally to raise the entire coil, care being taken not to elevate the coil far enough to carry the bar 55' of the handle above the level of the stops 78 and 80.

By relatively adjusting the stops 78 and 80 toward or from each other, the amount of overlap in the rings between the lines $a$ and $b$, Fig. 6, can be adjusted as desired so that a predetermined length of facing material is severed in each cutting operation, and this length can be accurately adjusted. The machine thus reduces materially the labor involved in cutting clutch rings from a coil, and substantially eliminates waste of material, practically the only waste produced being the fraction of a ring which is left when the coil C becomes exhausted.

While I have herein shown and described a preferred embodiment of my invention, it will be understood that the invention may be embodied in other forms without departing from the spirit or scope thereof.

Having thus described my invention, what I desire to claim as new is:

1. In a machine of the character described, the combination of a support for a coil of flat facing material wound edgewise, cutting mechanism for severing said material substantially radially thereof, means operable to relatively rotate said coil and said mechanism, and means operative during said relative rotation to guide a strip of said facing material unwound from said coil into cooperative relationship to said cutting mechanism.

2. In a machine of the character described, the combination of a support for a coil of flat facing material wound edgewise, cutting mechanism for severing said material substantially radially thereof, means operable to relatively rotate said coil and said mechanism, means operative during said relative rotation to guide a strip of said facing material unwound from said coil into cooperative relationship to said cutting mechanism, and means for predetermining the lengths of the strips presented to said cutting mechanism for severing.

3. In a machine of the character described, the combination of a support for a coil of flat facing material wound edgewise, cutting mechanism, means operable to relatively rotate said coil and said mechanism, means operative during said relative rotation to guide a strip of said facing material unwound from said coil into cooperative relationship to said cutting mechanism, and means for stopping said relative rotation when a predetermined length of the strip has been brought into position to be severed by said mechanism.

4. In a machine of the character described, the combination of a support for a coil of flat facing material wound edgewise, means at the end of said coil for guiding a strip of said material unwound from said coil, means operable to relatively rotate said guiding means and coil to unwind said strip, and a cutting mechanism for severing said strip and toward which said strip is guided by said guiding means.

5. In a machine of the character described, the combination of a support for a coil of flat facing material wound edgewise, means at the end of said coil for guiding a strip of said material unwound from said coil, means operable to relatively rotate said guiding means and coil to unwind said strip, a cutting mechanism for severing said strip and toward which said strip is guided by said guiding means, and means whereby the length of the strip positioned for severing may be adjusted.

6. In a machine of the character described, the combination of a support for a coil of flat facing material wound edgewise, means for guiding a strip of said material unwound from said coil, means operable to relatively rotate said guiding means and coil to unwind said strip, a cutting mechanism for severing said strip approximately radially and toward which mechanism said strip is guided by said guiding means, and means for stopping said relative rotation when a point at a predetermined distance from the end of the strip has arrived in cutting relationship to said mechanism.

7. In a machine of the character described, the combination of a support for a coil of facing material, means for guiding a strip of said material unwound from said coil, means operable to relatively rotate said guiding means and coil to unwind said strip, a cutting mechanism for severing said strip and toward which said strip is guided by said guiding means, and mechanism for relatively moving said coil and cutting mechanism in a direction substantially parallel to the axis of the coil.

8. In a machine of the character described, the combination of a support for a coil of flat facing material wound edgewise, means for guiding a strip of said material unwound from said coil, means operable to relatively rotate said guiding means and coil intermittently to unwind lengths of said strip from the coil, cutting mechanism to which said lengths are guided by said guiding means, said cutting mechanism being operable to sever said strip substantially radially thereof, and means whereby the individual lengths of the strips positioned for severing may be predetermined.

9. In a machine of the character described, the combination of a support for a coil of flat facing material wound edgewise, cutting mechanism, means for supporting said cutting mechanism at the end of said coil, means operable to relatively rotate said coil and said mechanism, means operative during said relative rotation to guide a strip of said facing material unwound from said coil into cooperative relationship to said cutting mechanism, and a stop for interrupting said relative rotation when a substantially predetermined length of the strip has been unwound and presented in cutting position, said stop being adjustable whereby said length may be adjusted.

10. In a machine of the character described, the combination of a support for a coil of flat facing material wound edgewise, means at the end of the coil for guiding a strip of said material unwound from said coil, means operable to relatively rotate said guiding means and coil to unwind said strip, a cutting mechanism for severing said strip and toward which said strip is guided by said guiding means, means whereby the length of each strip so positioned for severing may be adjusted, and mechanism operable to relatively adjust said coil and said cutting and guiding means in a direction substantially parallel to the axis of the coil.

11. In a machine of the character described, the combination of a table for holding a coil of facing material in an upright position, a support adapted to rest on the top of said coil, cutting mechanism for severing lengths of the strip of material unwound from said coil, parts on said support for guiding said strip of material into position to be severed by said cutting mechanism, and means operable to relatively rotate said coil and said guiding means.

12. In a machine of the character described, the combination of a table mounted for rotary movement and arranged to hold a coil of facing material in an upright position, means for securing said coil on said table, a support adapted to rest on the top of said coil, means for holding said support centered with reference to the coil, parts carried by said support for guiding the strip of material unwound from said coil away from the main body of the coil, cutting mechanism for severing said strip and to which the strip is guided by said guiding means, and means operable to relatively rotate said table and said support to unwind said strip and present it to said cutting mechanism.

13. In a machine of the character described, the combination of a table mounted for rotary movement and arranged to hold a coil of facing material in an upright position, a support adapted to rest on the top of said coil, means for holding said support centered with reference to the coil, a cutting mechanism mounted on said support and adapted to sever the strip unwound from said coil, parts carried by said support for guiding said strip away from the main body of the coil and to said cutting mechanism, means operable to relatively rotate said table and said support to unwind said strip and present it to said cutting mechanism, and means for predetermining the lengths of the strips presented to said cutting mechanism for severing, said predetermining means being adjustable, whereby the lengths severed from the coil may be varied as desired.

14. In a machine of the character described, the combination of a table mounted for rotary movement and arranged to hold a coil of facing material in an upright position, an elevating mechanism for raising and lowering said table, a support adapted to rest on top of said coil, means including a shaft extending through said coil for holding said support centered with reference to the coil, cutting mechanism mounted on said support for severing the strip of material unwound from said coil, means operable to relatively rotate said support and table, guiding devices carried by said support and serving during said relative rotation to unwind the strip and guide it to said cutting mechanism, and stops for limiting said relative rotation in both directions.

15. In a machine of the character described, the combination of a table mounted for rotary movement and arranged to hold a coil of facing material in an upright position, a support adapted to rest on the top of said coil, means for holding said support centered with reference to the coil, a cutting mechanism mounted on said support and adapted to sever the strip unwound from said coil, parts carried by said support for guiding said strip away from the main body of the coil and to said cutting mechanism, a handle secured to said support whereby the support may be rotated to unwind said strip and guide it to said cutting mechanism, means for preventing said coil from rotating in one direction but permitting its rotation in a reverse direction, means operable to compel the coil to rotate with said support in a reverse direction, and stops serving to limit the rotation of said support in both directions.

16. In a machine of the character described, the combination of a support for a coil of facing material, means for guiding a strip of said material unwound from said coil, a cutting mechanism for severing said strip and toward which said strip is guided by said guiding means, devices operable to relatively rotate said guiding means and coil including means for rotating said coil in one direction and said mechanism in the opposite direction, and stops for limiting both of said rotary movements.

17. In a machine of the character described, the combination of a support for a coil of flat facing material wound edgewise, means for guiding a strip of said material unwound from said coil, means operable to rotate said guiding means intermittently about the axis of said coil to unwind lengths of said strip from the coil, cutting mechanism to which said lengths are guided by said guiding means, and means whereby the individual lengths of strips positioned for severing by said cutting mechanism may be predetermined.

18. In a machine of the character described, the combination of a support for a coil of flat facing material wound edgewise, means for guiding a strip of said material unwound from said coil, means operable manually to rotate said guiding means intermittently about the axis of said coil to unwind lengths of said strip from said coil, cutting mechanism to which said lengths are guided by said guiding means, and means for stopping said rotative movement of said guiding means when a predetermined length of the strip has been brought into position to be severed by said cutting mechanism.

THOMAS HANDEL BATESON.